Figure 1:
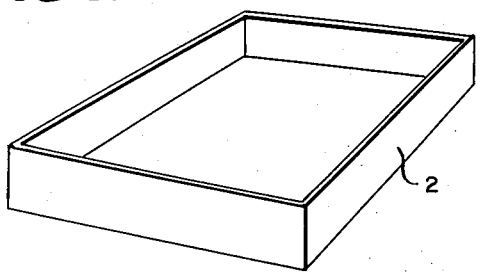

Aug. 11, 1964    W. C. RAINER ETAL    3,144,398
POLYETHYLENE PRODUCT AND PROCESS
Filed June 16, 1958

INVENTORS
WILLIAM C. RAINER
EDWARD M. REDDING
ARTHUR W. SLOAN
WILLIAM D. STEWART
BY JOSEPH J. HITOV

Cushman, Darby + Cushman
ATTORNEYS

United States Patent Office 3,144,398
Patented Aug. 11, 1964

3,144,398
POLYETHYLENE PRODUCT AND PROCESS
William C. Rainer, Barrington, R.I., Edward M. Redding, Winnetka, Ill., Joseph J. Hitov, Levittown, Pa., Arthur W. Sloan, Washington, D.C., and William D. Stewart, Alexandria, Va., assignors to W. R. Grace & Co., Cambridge, Mass., a corporation of Connecticut
Filed June 16, 1958, Ser. No. 742,235
18 Claims. (Cl. 204—154)

This application is a continuation-in-part of application Serial No. 516,236, filed June 17, 1955, now Patent No. 2,877,500, March 17, 1959.

Polyethylene has been modified by numerous procedures including irradiation. It is known that irradiation cross links polyethylene and hence makes it more resistant to change in shape upon heat treatment. However, in many instances it is desirable to have cross linked polyethylene which can be stretched and then shrunk substantially.

It is an object of the present invention to prepare irradiated polyethylene which can be readily changed from a stretched to a shrunken condition.

A further object is to prepare irradiated polyethylene having novel shrinking properties.

A further object is to prepare a novel stretched polyethylene.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by cold stretching polyethylene and thereafter irradiating the polyethylene. The polyethylene can then be heated to shrink the same. In general the higher the heating temperature the greater the amount of shrinking. For best results the cold stretching should be done below 65° C. Preferably the temperature of cold stretching is at least 40° C. below the temperature of hot shrinking. The hot shrinking is usually carried out above 65° C. and preferably above 90° C. The temperature can be as high as 110° C. or even 120° C. Thus, when hot shrinking at 120° C. the temperature of cold stretching is preferably not over 80° C.

The cold stretched, irradiated polyethylene of the present invention is useful in preparing monofilaments and can also be employed to prepare containers, closures, squeeze bottles, toys, film packaging materials, flexible bags etc. The heat shrinking properties of the polyethylene likewise can be taken advantage of in such uses or in encapsulation, etc.

The cold stretching can be carried out at a temperature up to 65° C., with room temperature (about 20° C.), being preferred. Any conventional stretching mechanism can be used, cold calendering being presently preferred. The stretching can be either uniaxial or biaxial. By uniaxial orientation the molecules are assembled in columns facing in the direction of stretch. e.g., lateral or longitudinal. Orienting biaxially moves the molecules into both a forward and a lateral arrangement. Biaxial stretching can be accomplished by passing a sheet through calendering rolls in one direction and then passing the sheet through the calendering rolls in a second direction perpendicular to the first direction. The stretching in one or both directions can be 100%, 175%, 200%, 300% or 500% or even 900%. Stretching of course should be below the break limit.

The irradiation can be at a dosage as low as $2 \times 10^6$ rep. although for significant cross linking the dosage should be at least $6 \times 10^6$ rep. and desirably is $10 \times 10^6$ rep. or higher, e.g., $20 \times 10^6$ rep. Preferably the dosage is not over $100 \times 10^6$ rep. since above this dosage the polyethylene takes on a permanent amber tint. Generally a range of $8 \times 10^6$ rep. to $75 \times 10^6$ rep. is preferred. The irradiation also is preferably done at a temperature below that at which premature shrinkage occurs. For convenience room temperature is usually employed although there is somewhat improved irradiation efficiency at slightly elevated temperatures.

The polyethylene prior to cold calendering can have a thickness of 3 mils or less, e.g., 1 mil, up to 100 mils, or even higher, e.g., 250 mils or 500 mils. The calendering can be done in one operation or the sample can be passed repeatedly through the calendering rolls in order to develop the desired amount of stretching.

The present process of cold stretching followed by irradiation gives a product which has a frosty transparency. This can be taken advantage of to prepare decorative drinking cups.

In the examples regular low density polyethylene was used. There can be employed various conventional polyethylenes which are solid at room temperature. The polyethylene may have a molecular weight of 7,000, 12,000, 19,000, 21,000, 24,000, 30,000, 35,000 or even higher. There can be employed either high pressure or low pressure polyethylene and either high, medium or low density polyethylene.

Irradiation can be accomplished by various methods. Thus there can be used electrons, X-rays, gamma rays by employing iron 59 or cobalt 60, $\beta$-rays for example by employing cobalt 60, carbon 14, phosphorus 32, or strontium 90, ultra violet light above 2000 A. and below 2700 A., e.g. 2537 A. Preferably, electrons of at least $10^5$ electron volts energy are employed. The irradiation source in the examples was a Van de Graaff electrostatic generator, manufactured by the High-Voltage Engineering Corporation, Cambridge, Mass. This machine is a high voltage X-ray generator and was modified by removal of the tungsten target from the path of the electrons to permit thereby irradiation of the objects at the port. The generator was operated at two million volts with an amperage of 41 microamps at the target area per inch of scan. A dosage of $2 \times 10^6$ rep. was given with each 0.75 second of treatment.

Alternatively there can be employed other sources of high energy electrons such as the General Electric 800,-000 volt resonant transformer unit described by Lawton et al. in Industrial and Engineering Chemistry, vol. 46, pages 1703 to 1709, or the more powerful 1,000,000 and 2,000,000 volt Resonant Transformers of General Electric or other conventional apparatus for producing beams of electrons such as those recited for example in Brophy Patent No. 2,668,133, column 3, lines 5 to 29.

A rep., as is recognized in the art, is defined as that amount of nuclear radiation which dissipates 93 ergs of energy per gram of tissue producing $1.61 \times 10^{12}$ ion pairs in the process. It is approximately equal to the amount of energy that would be dissipated by a one roentgen X-ray beam in a gram of tissue.

The time of irradiation, while not critical, as long as a dosage of sufficient rep. is attained, can vary between 0.75 second and 75 seconds, preferably between 7.5 seconds and 45 seconds, with the apparatus of the example. The voltage can also vary quite widely and can be 750,000 or 1,000,000 or 2,000,000 or 3,000,000 or 6,000,000 volts, or even higher. Lower voltages can be employed, e.g., 500,000 or 100,000 or lower. By appropriate combination of time of treatment and voltage, the desired rep. dosage can be obtained.

Ozone has a tendency to attack polyethylene. Consequently, it is frequently desirable to have good ventilation or to carry out the irradiation while the polymer is in an atmosphere of inert gas, such as nitrogen or argon. Thus, the irradiation process of the example can be carried out while continuously passing a stream of argon over the stretched polyethylene.

It is also sometimes desirable to carry out the irradiation while the polyethylene is maintained in a vacuum, e.g., 1 mm. or less. Thus, the irradiation of the example can be carried out while the polyethylene is in a vacuum of 0.1 mm. total pressure.

In the following example all of the samples were prepared from the same polyethylene, molecular weight about 20,000, reduced in thickness from about 155 mils to about 30 mils by cold calendering at room temperature. Irradiation was carried out at room temperature.

The hot stretched comparison sample was prepared by pulling the polyethylene film from 35 mils to 14 mils thickness at its transition point after irradiation. The hot stretched sample was cooled slowly to room temperature. It will be observed that the cold calendered sample irradiated at a dosage of $20 \times 10^6$ rep. had about eight times the amount of shrink of the hot stretched sample at 107° C. and about 7 times the amount of shrink at 93° C.

The cold calendered, irradiated samples exhibited more shrinkage at 107° C. than the unirradiated sample because the latter had little form stability at this temperature. Thus the cold calendered, irradiated samples had the advantage of not only a large amount of shrink at elevated temperature but also the ability to retain their shape during shrinking.

*Example*

COLD CALENDERED BEFORE IRRADIATION

| Dosage | Shrinkage after 15 min. in the oven at— | | | |
|---|---|---|---|---|
| | 66° C. | 79° C. | 93° C. | 107° C. |
| 0 percent | 9.3 | 35 |  | 168.0 |
| $20 \times 10^6$ rep do | 9.3 | 34.4 |  | 350.0 |
| $40 \times 10^6$ rep do | 1.9 | 14.8 | 41.2 | 241.0 |
| $52 \times 10^6$ rep do | 1.9 | 10.0 | 41.4 | 251.0 |
| $76 \times 10^6$ rep do | 0.0 | 6.7 | 26.7 | 191.0 |
| $100 \times 10^6$ rep do | 0 0 | 6.2 | 24.8 | 170.0 |
| $200 \times 10^6$ rep do | 0.0 | 0.0 | 14.3 | 62.9 |

HOT STRETCHED AFTER IRRADIATION

| | 66° C. | 79° C. | 93° C. | 107° C. |
|---|---|---|---|---|
| $0 \times 10^6$ rep percent | 0.0 | 0.0 | 5.9 | 44.1 |

It will also be observed that the products of the present invention exhibit substantial shrinking only at considerably elevated temperatures and hence there is little or no danger of premature shrinkage at normal temperature.

Figure 2:
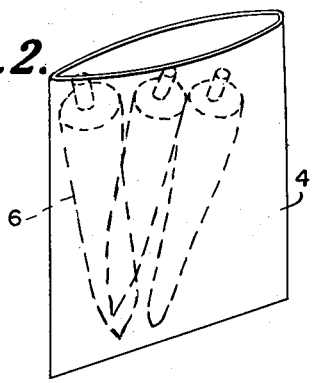
Figure 3:
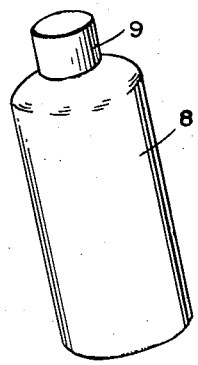
Figure 4:
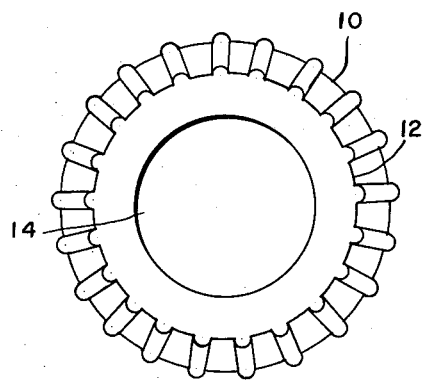
Figure 5:
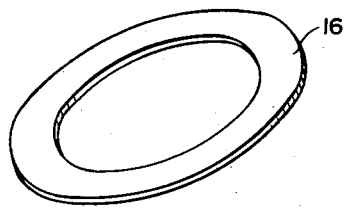

Typical uses for the products prepared by the process of the present invention are illustrated in the drawings, wherein FIGURE 1 is a perspective view of a box;
FIGURE 2 is a perspective view of a flexible bag;
FIGURE 3 is a perspective view of a bottle;
FIGURE 4 is a bottom view of a crown cap; and
FIGURE 5 is a perspective view of a ring gasket.

Referring more specifically to the drawings, in FIGURE 1 there is shown a box 2 made of the irradiated polyethylene of the present invention.

In FIGURE 2 there is shown a flexible bag 4 made of the irradiated polyethylene. Such bags are useful for displaying products designated generically at 6.

The irradiated polyethylene also can be used in making a squeeze bottle 8 having a cap 9.

The irradiated polyethylene also can be formed into a cap liner such as the liner 12 in crown cap 10. The liner can have a central recess as shown at 14.

In addition, the irradiated polyethylene can be formed into a ring gasket 16.

We claim:
1. A process comprising stretching polyethylene at a temperature from room temperature up to 65° C. and then irradiating the polyethylene at a dosage between about $20 \times 10^6$ and $200 \times 10^6$ rep.
2. A process according to claim 1 wherein the dosage is between about $40 \times 10^6$ and $100 \times 10^6$ rep.
3. A process according to claim 1 wherein the irradiation is with electrons.
4. A process according to claim 1 wherein the stretching is carried out by calendering.
5. A process according to claim 4 wherein the dosage is between about $20 \times 10^6$ and $100 \times 10^6$ rep.
6. A process comprising stretching polyethylene at a temperature from room temperature to about 65° C. and then irradiating the polyethylene at a dosage between $2 \times 10^6$ and $200 \times 10^6$ rep. and thereafter heating the stretched, irradiated polyethylene to a temperature of at least about 66° C. and sufficient to cause the polyethylene to shrink.
7. A process according to claim 6 wherein the polyethylene is biaxially stretched.
8. A process according to claim 6 wherein the polyethylene is uniaxially stretched.
9. A process according to claim 6 wherein the dosage is between about $2 \times 10^6$ and $100 \times 10^6$ rep. and the stretched, irradiated polyethylene is thereafter heated to at least 79° C.
10. A process comprising shrinking polyethylene which has been previously stretched and thereafter irradiated with high energy irradiation equivalent to at least about 100,000 electron volts at a dosage between $2 \times 10^6$ and $100 \times 10^6$ rep., said shrinking being accomplished by heating the stretched and irradiated polyethylene to a temperature of at least about 79° C.
11. A process according to claim 10 wherein the heating is accomplished at a temperature of at least 93° C.
12. A process comprising stretching polyethylene at a temperature from room temperature up to 65° C. and thereafter irradiating at a dosage between about $2 \times 10^6$ and $200 \times 10^6$ rep. and thereafter heating the stretched, irradiated polyethylene to a temperature of at least about 93° C.
13. A process according to claim 6 wherein the irradiation dosage is between $6 \times 10^6$ and $20 \times 10^6$ rep. and the stretched, irradiated polyethylene is thereafter heated to at least 79° C.
14. A process according to claim 13 wherein the polyethylene is biaxially stretched.
15. A process comprising shrinking polyethylene which has been previously stretched and thereafter irradiated at a dosage between $2 \times 10^6$ and $200 \times 10^6$ rep., said shrinking being accomplished by heating the stretched and irradiated polyethylene to a temperature of at least about 79° C. and sufficient to cause the polyethylene to shrink.
16. A process according to claim 15 wherein the irradiation is at a dosage between $6 \times 10^6$ and $75 \times 10^6$ rep., and the polyethylene is biaxially stretched.
17. A process according to claim 15 wherein the irradiation dosage is between $20 \times 10^6$ and $200 \times 10^6$ rep. and the temperature of shrinking is at least 93° C.
18. A process according to claim 15 wherein the irradiation dosage is between $20 \times 10^6$ and $100 \times 10^6$ rep. and the temperature of shrinking is at least 79° C.

References Cited in the file of this patent

UNITED STATES PATENTS 2,855,517    Rainer et al. _____ Oct. 7, 1958

FOREIGN PATENTS 739,709    Great Britain _____ Nov. 2, 1955
204,798    Australia _____ Dec. 4, 1956